(12) United States Patent
Lang et al.

(10) Patent No.: US 10,429,224 B2
(45) Date of Patent: Oct. 1, 2019

(54) INTERFACE FOR A CORIOLIS FLOW SENSING ASSEMBLY

(71) Applicant: General Electric Company, Schenectady, NY (US)

(72) Inventors: Philipp Lang, Bad Waldsee (DE); Jens Rütten, Wegberg (DE); Charles Erklin Seeley, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 78 days.

(21) Appl. No.: 15/832,519

(22) Filed: Dec. 5, 2017

(65) Prior Publication Data

US 2019/0170554 A1    Jun. 6, 2019

(51) Int. Cl.
  *G01F 1/84* (2006.01)
  *G01F 15/02* (2006.01)

(52) U.S. Cl.
  CPC ............ *G01F 1/8418* (2013.01); *G01F 1/849* (2013.01); *G01F 1/8477* (2013.01); *G01F 15/024* (2013.01)

(58) Field of Classification Search
  None
  See application file for complete search history.

(56) References Cited

U.S. PATENT DOCUMENTS

| | | | |
|---|---|---|---|
| 4,738,144 A | 4/1988 | Cage | |
| 5,115,683 A | 5/1992 | Pratt | |
| 5,321,991 A | 6/1994 | Kalotay | |
| 5,497,666 A * | 3/1996 | Patten | G01F 1/8413 73/861.355 |
| 5,555,190 A | 9/1996 | Derby et al. | |
| 5,691,485 A * | 11/1997 | Endo | G01F 1/8409 73/861.357 |
| 6,748,813 B1 * | 6/2004 | Barger | G01F 1/8409 73/861.354 |
| 8,126,661 B2 * | 2/2012 | Henry | G01F 1/74 702/100 |
| 8,302,489 B2 * | 11/2012 | Bell | G01F 1/74 73/861.04 |
| 8,573,067 B2 * | 11/2013 | Lanham | G01F 1/8418 73/861.355 |
| 8,596,142 B2 * | 12/2013 | Huber | G01F 1/8427 73/861.357 |
| 9,395,224 B2 * | 7/2016 | Rao | G01F 1/8427 |

(Continued)

FOREIGN PATENT DOCUMENTS

DE    4311694 C1    9/1994
WO    2008056976 A1    5/2008

OTHER PUBLICATIONS

U.S. Appl. No. 15/384,806, filed Dec. 20, 2016, Rütten.

(Continued)

*Primary Examiner* — Jewel V Dowtin
(74) *Attorney, Agent, or Firm* — Arent Fox, LLP (57) ABSTRACT

Provided is a Coriolis flow sensor assembly that includes a flow tube configured to provide a flow path through the flow tube. Further, the Coriolis flow sensor assembly includes a mechanical drive assembly configured to drive an oscillation of the flow tube while fluid is flowing via an oscillation surface. The Coriolis flow sensor assembly includes an interface fixedly coupled to the oscillation surface of the mechanical drive assembly and configured to receive the flow tube.

20 Claims, 11 Drawing Sheets

(56) References Cited

U.S. PATENT DOCUMENTS

2015/0377673 A1 12/2015 Seeley et al.
2017/0205263 A1 7/2017 Kunze

OTHER PUBLICATIONS

Clark et al., The Influence Upon Coriolis Mass Flow Meters of External Vibrations at Selected Frequencies, The Flow Measurement and Instrumentation, Mar.-Apr. 2003, pp. 33-42, vol. 14, Issue 1-2.
Smith et al., A MEMS-Based Coriolis Mass Flow Sensor for Industrial Applications, IEEE Transactions on Industrial Electronics, Apr. 2009, pp. 1066-1071, vol. 56, Issue 04.
Enoksson et al., A Silicon Resonant Sensor Structure for Coriolis Mass-Flow Measurements, Journal of Microelectromechanical Systems, Jun. 1997, pp. 119-125, vol. 06, Issue 02.
International Search Report and Written Opinion corresponding to International Application No. PCT/EP2018/083555, dated Mar. 19, 2019.

\* cited by examiner

INTERFACE FOR A CORIOLIS FLOW SENSING ASSEMBLY

BACKGROUND

The present disclosure relates generally to Coriolis flow sensors. More specifically, the present disclosure relates to a Coriolis flow sensor assembly with an interface coupling an oscillator to a flow tube that improves sensitivity of the measurements performed by the Coriolis flow sensor.

Accurate measurements of the properties of fluids delivered through flow systems is important for a variety of applications, such as in bioprocessing systems and oil and gas pipelines. One technique for measuring the properties of fluids is by using the flow rate. This permits measurements to be performed during fluid delivery, which is advantageous for reducing associated operating costs. That is, active flow systems may be operational during measurement. Flow rates may be measured either as volumetric flow rates or mass flow rates. Volumetric flow rates are accurate if the density of the fluid is constant; however, this is not always the case as the density may change significantly with temperature, pressure, or composition. As such, mass flow rates are typically more reliable for measuring fluid flow. One method for measuring mass flow rates is through a Coriolis flow sensor (e.g., a flow meter). In general, a Coriolis flow sensor measures mass flow rates via the Coriolis force that results from the fluid as it moves through an oscillating tube.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible embodiments. Indeed, the disclosure may encompass a variety of forms that may be similar to or different from the embodiments set forth below.

Provided herein is an assembly that includes a flow tube configured to provide a flow path through the flow tube. Further, the assembly includes a mechanical drive assembly configured to drive an oscillation of the flow tube while fluid is flowing, wherein the mechanical drive assembly comprises an oscillation surface. Even further, the assembly includes an interface fixedly coupled to the oscillation surface of the mechanical drive assembly and configured to receive the flow tube such that at least a portion of the interface is in direct contact with the flow tube and such that the interface transfers oscillation forces of the oscillation surface to the flow tube.

Provided herein is an assembly that includes a mechanical drive assembly configured to drive an oscillation of a flow tube while fluid is flowing, wherein the mechanical drive assembly comprises an oscillation surface. Further, the assembly includes an interface fixedly coupled to the oscillation surface of the mechanical drive assembly and configured to receive the flow tube, wherein the interface is configured to transfer oscillation forces from the oscillation surface to the flow tube.

Provided here in is an assembly that includes a flow tube configured to provide a fluid flow path through the flow tube. Further, the assembly includes a mechanical drive assembly configured to drive an oscillation of the flow tube while fluid is flowing via an oscillation surface. Even further, the assembly includes an interface fixedly coupled to the oscillation surface of the mechanical drive assembly and configured to receive the fluid flow assembly such that the interface is in direct contact with an outer surface of the flow tube.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Coriolis flow sensors are useful in numerous applications that involve fluid delivery, such as bioprocessing systems. In general, a Coriolis flow sensor operates by measuring a phase shift of one or more oscillating flow tubes that results from a Coriolis force. It is beneficial to provide a Coriolis flow sensor design that increases the effect of the Coriolis force, which in turn results in an increased mass flow sensitivity and sensing amplitude (high signal to noise ratio: SNR). Certain Coriolis flow sensors are often used in conjunction with a continuous tubing that is uniform along its length.

Certain approaches to implementing Coriolis flow sensors aim to magnify the flow sensitivity by shaping the tubing, and the corresponding fluid flow path, into favorable geometrical forms. However, in addition to improving the sensitivity of the Coriolis flow sensor measurement, the Coriolis flow sensor should also be robust against environmental disturbances that may impact the accuracy of sensor readings. Many approaches to modifying the geometric form of the tubing often result in large tubing loops that have no advantage in zero point stability because external disturbances are also magnified (which in turn decrease sensor accuracy). Thus, the effective signal to noise ratio may remain the same. Further, these configurations also take up additional space in a fluid flow system, and looped geometric form modifies the fluid flow path; which influence pressure loss, flow velocity, shear rate, trappings, draining, and abrasion.

The present disclosure is directed to techniques for Coriolis flow sensing that include interfaces that facilitate coupling between a flow tube and an oscillator of a Coriolis flow sensor assembly. In general, the interface facilitates transmission of non-dissipative forces (e.g., drive oscillation imparted by the oscillator, and the Coriolis force), but limits the transmission of environmental disturbances (e.g., pressure and temperature) that may result in undesirable effects on the non-dissipative forces. Generally, the interface couples the oscillator and the flow tube, and the interface may be disposed between the flow tube and the oscillator and in certain embodiments, the flow tube may not directly contact the oscillator. The interface is disposed on the oscillator (i.e., may directly contact both the oscillator and the flow tube) and may receive the flow tube (e.g., via suitable structural features that permit the flow tube to reside within or on the interface). In certain embodiments, the interface may be connected to the oscillator at anchor points (e.g., fitting with hooks, screwed or bolted in, adhered) in order to reduce coupling points for mechanical deformation. The interface may include an adhesive and/or may couple to the flow tube through a friction fit. Moreover, the interface may contain structural features (e.g., arms, walls, ribs, clamps, wiring) that couple (e.g., hold or contain) with the flow tube. The embodiments of the present disclosure are applicable to Coriolis flow sensor assemblies and system that incorporate such assemblies. Applications include life sciences, bioprocessing, clean room, food industry, pharmaceuticals, lab on a chip, oil and gas, water flow, and hydrogen pumping (high T gradient).

Figure 1:
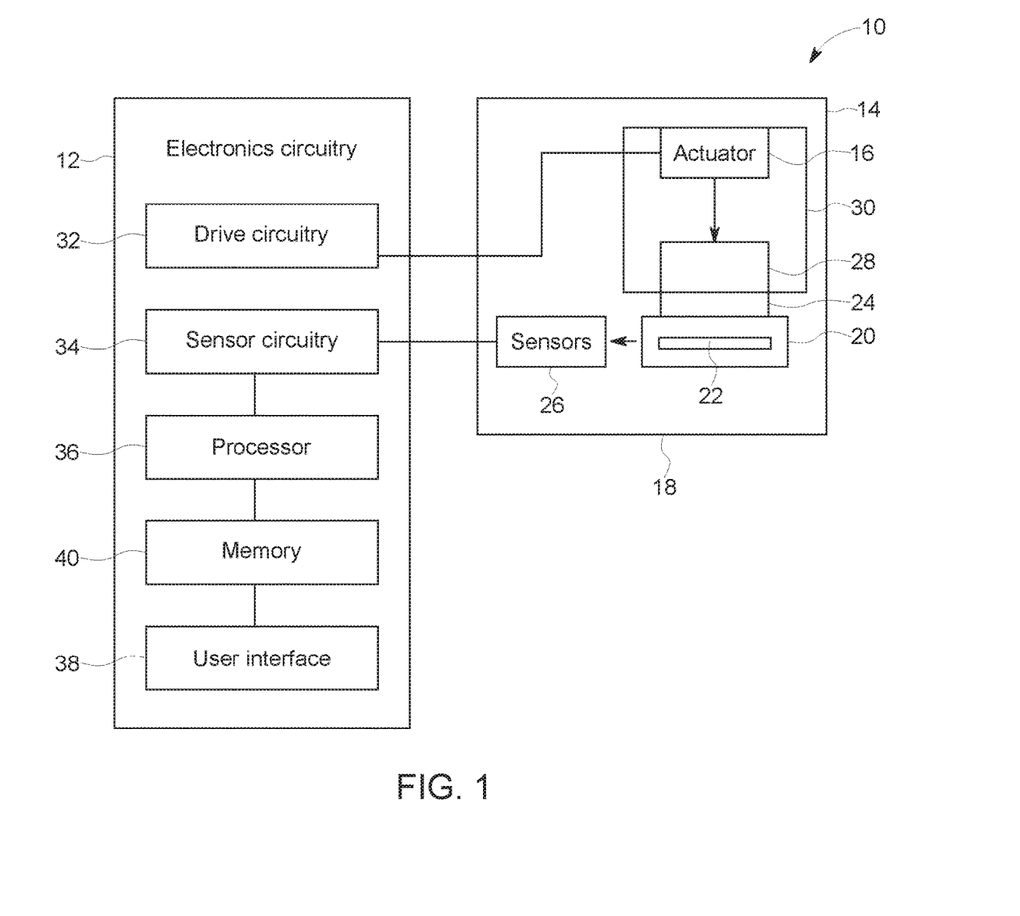
FIG. 1 is a block diagram of a Coriolis flow sensor system in accordance with the present disclosure.

Turning now to the figures, FIG. 1 is a block diagram illustrating an embodiment of a Coriolis flow sensor system 10. The Coriolis flow sensor system 10 includes electronics circuitry 12 coupled to a sensor assembly 14. The sensor assembly 14 may, in certain embodiments, include a fluid flow assembly 18 that includes a flow tube 20 for retaining a fluid 22. The fluid flow assembly 18 is coupled to the oscillator through an interface 24; however, in certain embodiments the interface may not be used 24. In certain embodiments, sensor assembly 14 may include one or more actuators and one or more sensors 26.

It would be appreciated by those skilled in the art that certain components of the sensor assembly 14 may be configured as disposable parts, and the others may be configured as re-usable resident parts. For example, at least one of the flow tubes, the one or more actuators, or the one or more sensors may be disposable parts, and other parts are configured as reusable resident parts. It would be appreciated by those skilled in the art that the disposable part(s) may be replaced at very low cost in intervals governed by the specific process needs. In addition, in some implementations, the material of the flow tube 20 may be changed (glass or polymer or silicone or metal), without the need for replacement of the entire Coriolis flow sensor. For example, the flow tube 20 may be disposable, which permits a relatively low cost component to be replaced with retaining the higher costs components. Accordingly, in certain embodiments, the flow tube 20 may be removed from the interface 24 by operator manipulation. In addition, in certain embodiments, the interface 24 may be swapped out depending on the characteristics of the fluid and/or the system 10 to achieve improved sensing for a particular system configuration. The disposable-part sub-system allows obtaining high accuracy measurements, reusing of part of the Coriolis flow sensor system 10, provides a flexibility for single-use applications, and achieves cost and material savings.

Referring to FIG. 1, in some embodiments, the flow tube 20 may be coupled with a mechanical oscillator 28 or form a unitary assembly with mechanical oscillator 28. The one or more actuators 16 are used to induce oscillations of an appropriate amplitude over a required frequency range in the fluid 22 through the mechanical oscillator 28 and the flow tube 20. The mechanical oscillator 28 and the actuator 16 are referred to collectively as the mechanical drive assembly 30. The one or more sensors 26 are configured to provide signals indicative of a Coriolis response caused by the fluid 22 flowing through the flow tube 20. The one or more sensors 26 may include, for example, electromagnetic sensors, or optical sensors, and associated components.

The flow tube 20 may be configured as a conduit with an internal passage that permits fluid flow and may be formed in a shape including, but not limited to single, dual or multi loop configurations, split flow, straight tube, counter- or co-flow configurations. In some implementations, the flow tube 20 is made from, for example, a polymer whose influence on the oscillation modes (harmonic frequencies) of the mechanical oscillator is not dominant. In some other examples, the flow tube 20 is made of metal. In yet other examples, the flow tube 20 is made of glass. The flow tube material, in some examples, is tailored to specific requirements of the bioprocessing application, such as temperature, pressure, and the characteristics of the fluid to be measured (e.g., corrosivity).

The Coriolis flow sensor system 10 also includes electronics circuitry 12 coupled to the sensor assembly 14. The electronics circuitry 12 includes drive circuitry 32 to trigger the one or more actuator(s) 16 to generate oscillations in the flow tube 20 of the desired frequency and magnitude. The Coriolis flow sensor system 10 further includes sensor circuitry 34 to receive the Coriolis response from the flow tube 20. The electronics circuitry 12 further includes a processor 36 to process the Coriolis response signals received from the sensors 26 to generate one or more measurements representative of one or more properties of the fluid. These measurements are displayed via a user interface 38. The electronics circuitry 12 also includes a memory 40 to store the measurements for further use and communication, to store data useful for the drive circuitry 32, and the sensor circuitry 34.

In operation, the electronics circuitry 12 triggers the one or more actuator(s) to generate oscillations in the flow tube 20, which are transferred to the fluid 22. Due to these oscillations, the Coriolis response (vibration amplitude and phase) is generated in the fluid and is sensed by the sensors 26 through the flow tube 20. The sensed Coriolis response signal from the sensors 26 are transmitted to the electronics circuitry 12 for further processing to obtain the measurements of the one or more properties of the fluid including fluid flow.

Figure 2:
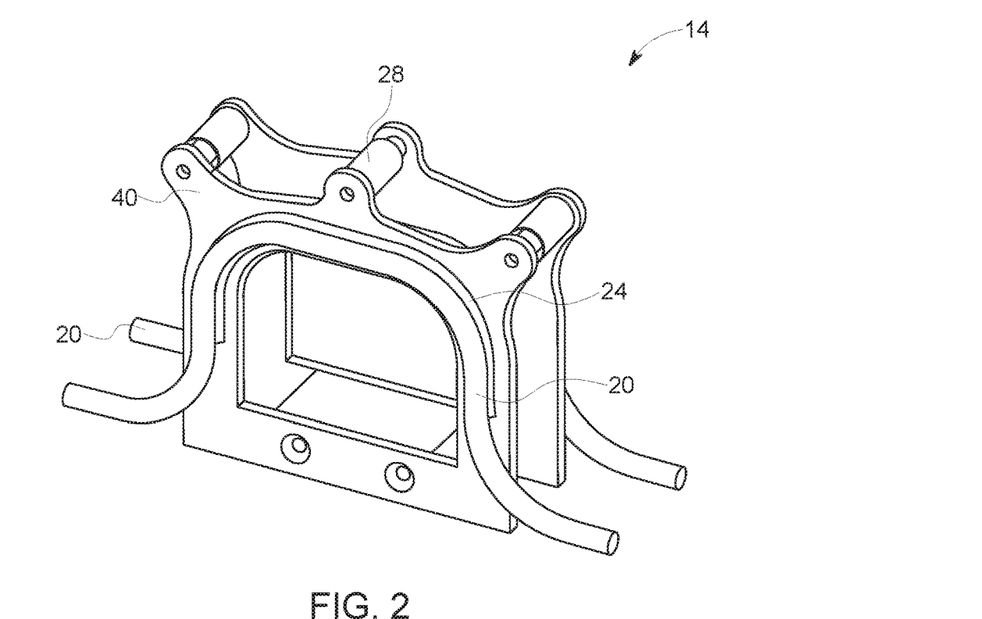
FIG. 2 is a perspective view of a Coriolis flow sensor assembly having a bent flow tube and an interface in accordance with the present disclosure.

FIG. 2 illustrates an embodiment of a sensor assembly 14 that includes an interface 24. The interface 24 couples the oscillator 28 to the flow tube(s) 20 (e.g., on a top surface 40 of the oscillator 28). In certain embodiments, the interface 24 may connect to the oscillator 28 through an oscillator mount (e.g., connected with bolts or screws). In other embodiments, the interface 24 may include an adhesive. In general, the interface 24 separates the oscillator 28 from the one or more flow tubes 20 and may permit force transmission between the oscillator 28 and the flow tube 20. As illustrated, the interface 24 is disposed continuously along the flow tube 20; however, in certain embodiments, the interface 24 may only be disposed on a portion of the oscillator 28 and/or flow tube 20, or at predetermined intervals (e.g., regular intervals, disposed at higher frequency towards the ends of the flow tube 20). In the illustrated embodiment, the flow tubes 20 coupled to the oscillator 28 via the interface 24 are restrained or bent in a looped configuration. Accordingly, the interface 24 follows the desired shape of the flow tube 20 and may serve to retain the flow tube 20 in the desired shape. For example, the depicted interface 24 is configured in a U-shape. However, the flow tube 20 may also be provided as a generally straight conduit with a fluid flow path aligned along an axis, and, in such embodiments, the interface 24 may be shaped to accommodate a generally straight flow tube 20. In any case, at least a portion of the interface 24 is positioned between the oscillator 28 and the flow tube 20 and serves to transfer oscillating forces and to protect against undesired disturbances. Further, in certain embodiments, the interface 24 may be configured as a reusable component configured to receive disposable flow tubes 20. In other embodiments, the flow tube 20 may be attached or adhered to the interface 24.

As provided herein, the interface 24 may decouple environmental disturbances or events, such as pressure and temperature changes, from the sensor assembly 14. Several features of the present disclosure to reduce the effects of environmental disturbances are discussed below.

Figure 3:
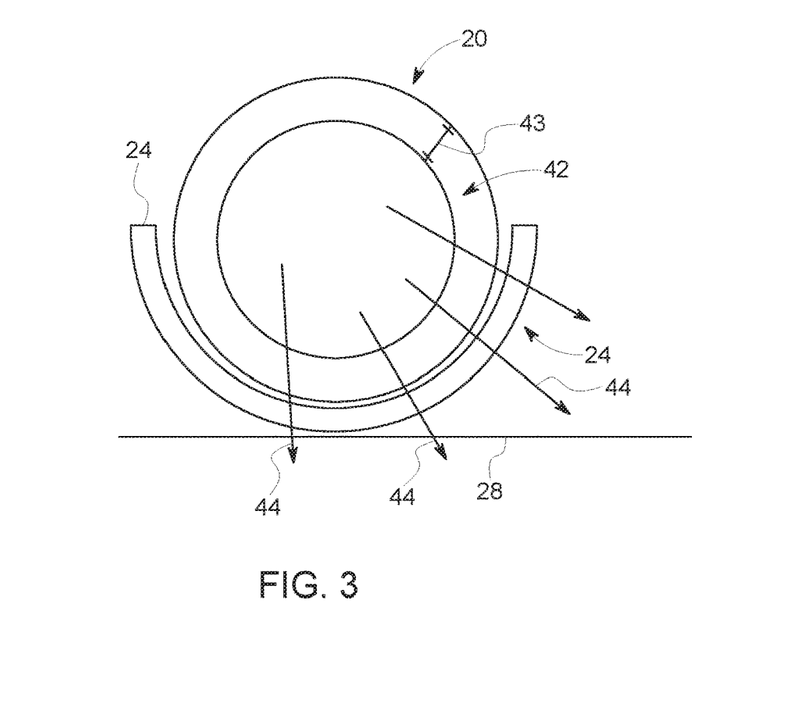
FIG. 3 is a cross-sectional view of heat flow through a flow tube of a Coriolis flow sensor assembly in accordance with the present disclosure.

FIG. 3 shows heat flow in the direction of arrow 44 through a cross section of the flow tube 20 of the sensor assembly 14. Temperature transmission through the flow tube walls 42 (which may be a function of wall thickness 43), from the flow tube 20 to the oscillator 28 (thermal bridge) may change the dynamic behavior from parts of the oscillator 28 or induce local stress via thermal expansion of the oscillator structure. The flow tube 20 is separated from the oscillator 28 by the interface 24, which reduces the heat transmission and therefore reduces potential changes to dynamic behavior of the oscillator 28.

Figure 4:
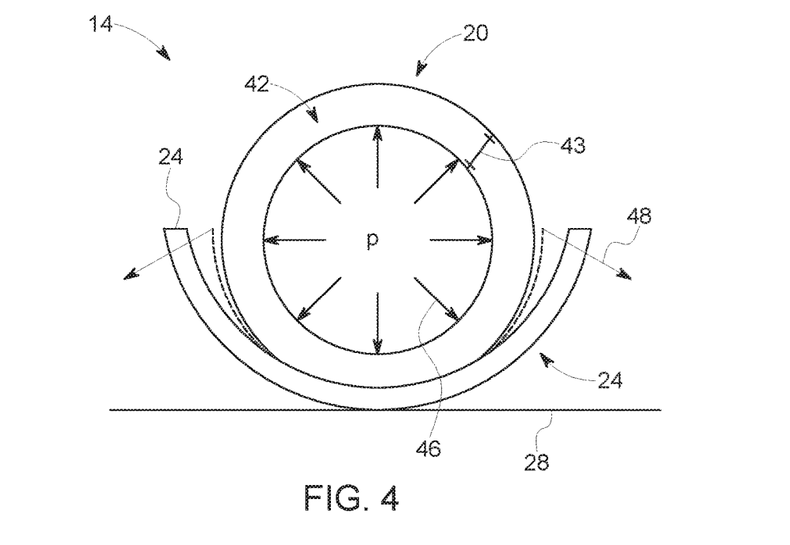
FIG. 4 is a cross-sectional view of pressure on the walls of a flow tube of a Coriolis flow sensor assembly in accordance with the present disclosure.

FIG. 4 illustrates fluid pressure (arrows 46) on the walls 42 of the flow tube 20 of the sensor assembly 14. During operation, the internal pressure from the flow tube 20 is transmitted to the oscillator 28 and may stretch/compress oscillator structures. In operation, this may result in a change of the dynamic behavior of the oscillating flow tube 20 or deformations in various spatial directions. These effects (e.g., change in dynamic behavior of the oscillating flow tube, deformations) may be addressed by oscillator geometries and signal post processing. As provided herein, the interface 24 used in conjunction with the sensor assembly. For example, the wall 42 of the flow tube 20 may experience a radial deformation (arrows 48) due to pressure expansion. The intervening interface 24 does not transfer the stress to a transversal deformation along the backbone, which would affect the oscillation of the flow tube 20 (e.g., resulting in an oscillation that deviates from the drive oscillation imparted by the oscillator 28).

In the embodiments depicted in FIGS. 3-4, the interface 24 is not flat, but has a round structure that receives (e.g., fits) around a portion of the flow tube 20. Further, the interface 24 does not fully surround the flow tube 20 (e.g., is not a continuous shell). A continuous shell around the fluid containment (e.g., flow tube 20) may permit temperature transmission from the oscillator that results in an unpredictable oscillation modes (e.g., variation of e-modulus along the oscillator and local oscillator deformations).

Figure 5:
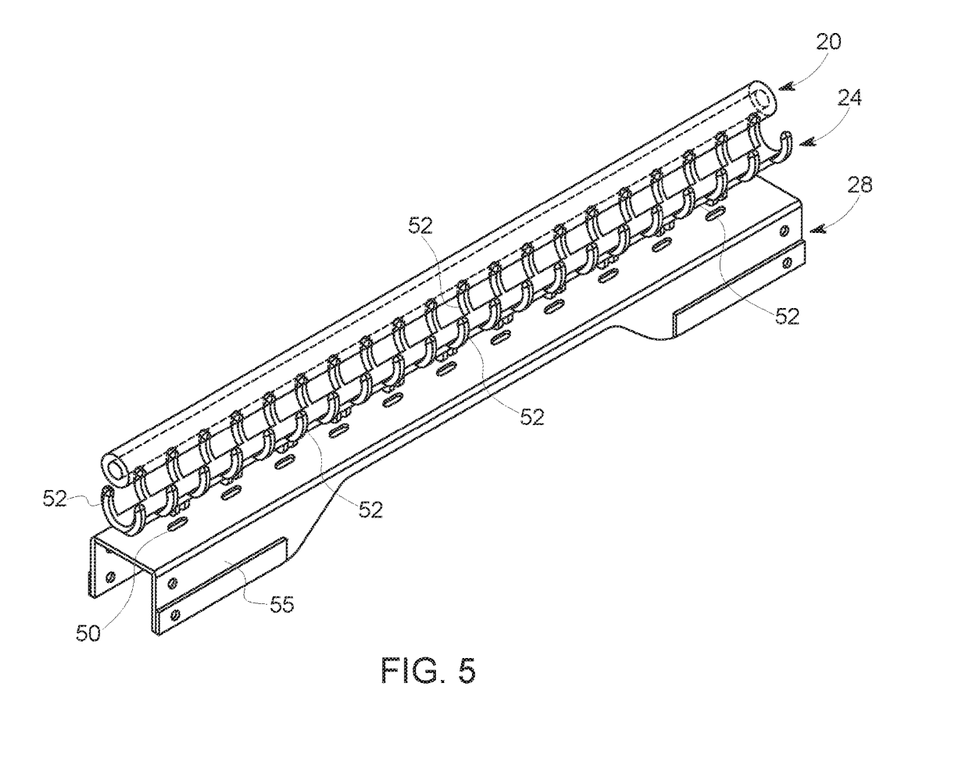
FIG. 5 is a perspective view of a Coriolis flow sensor assembly in accordance with the present disclosure.

FIG. 5 shows an embodiment of the interface 24 for coupling the flow tube 20 and the oscillator 28. As shown, the interface 24 includes a structural component (e.g., multiple ribs 52) that receives and retains the flow tube 20 in place. Upon assembly with the flow tube 20, the ribs 52 partially surround the circumference of the flow tube 20 to reduce unpredictable oscillation modes and transmission of environmental disturbances. Further, the ribs 52 minimize the heat transfer. As illustrated, the ribs 52 are separated at constant intervals. However, in certain embodiments, the ribs may have any suitable spacing to permit increasing performance of the sensor assembly 14. For example, more ribs 52 may be clustered towards the ends of the interface 24 and may be generally absent in the middle.

Figure 6:
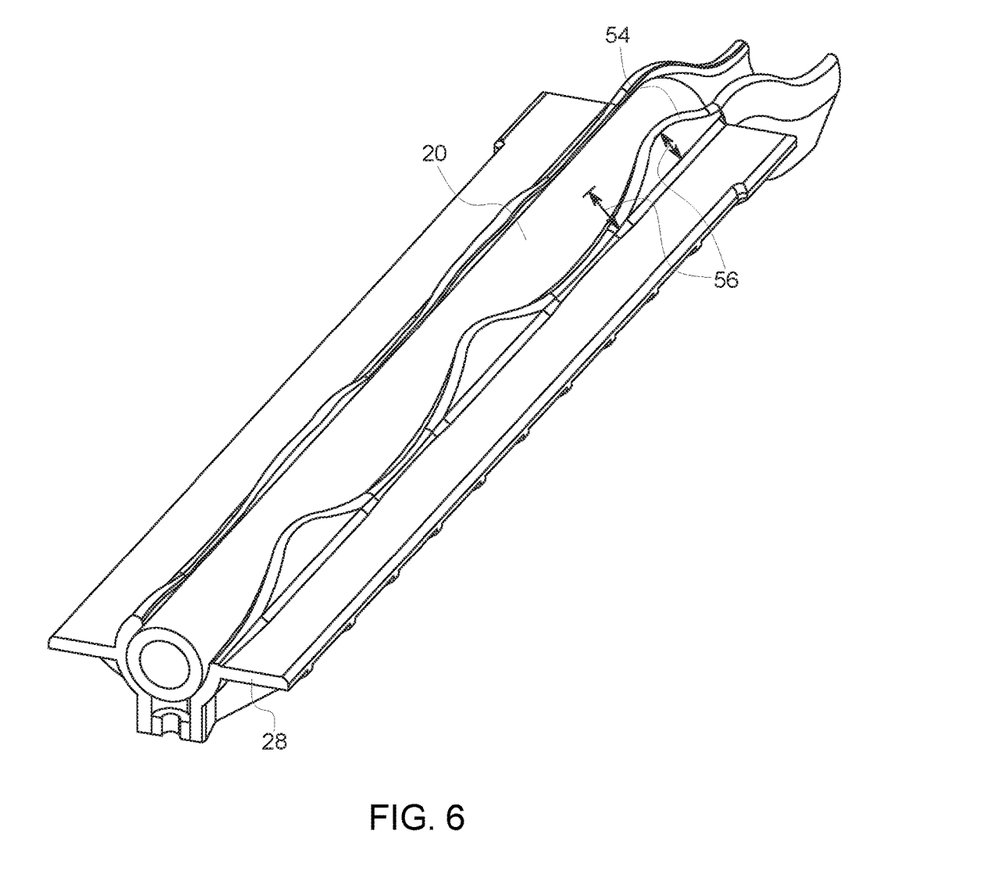
FIG. 6 is a perspective view of a Coriolis flow sensor assembly having an interface that receives a flow tube in accordance with the present disclosure.

As illustrated, the oscillator includes anchor points 50 (e.g., holes), which reduces the number of coupling points for mechanical deformation. Further, the anchor points 50 permit oscillator and Coriolis force transmission but limit the deformation transfer. Additionally, it should be recognized by one of ordinary skill in the art that the embodiment of the present disclosure illustrated in FIG. 5 permits manufacturing oscillators 28 from sheet-based, e.g., sheet metals. The interface 25 may additionally or alternatively be manufactured from polymers. Further, a variety of interfaces 24 may be employed to couple various sizes and types of flow tubes 20 to one oscillator 28, which increases the flexibility of the Coriolis flow sensing assembly of the present disclosure. Additionally, the oscillator 28 may include structural components 55 that damp modes of oscillations other than the main drive mode. FIG. 6 illustrates a flow tube 20 coupled to an oscillator 28 by an interface 24 with walls 54. As illustrated, the walls 54 have a varying height 56. As discussed above, it may be advantageous to have a non-continuous shell surrounding the flow tube 20.

Figure 7:
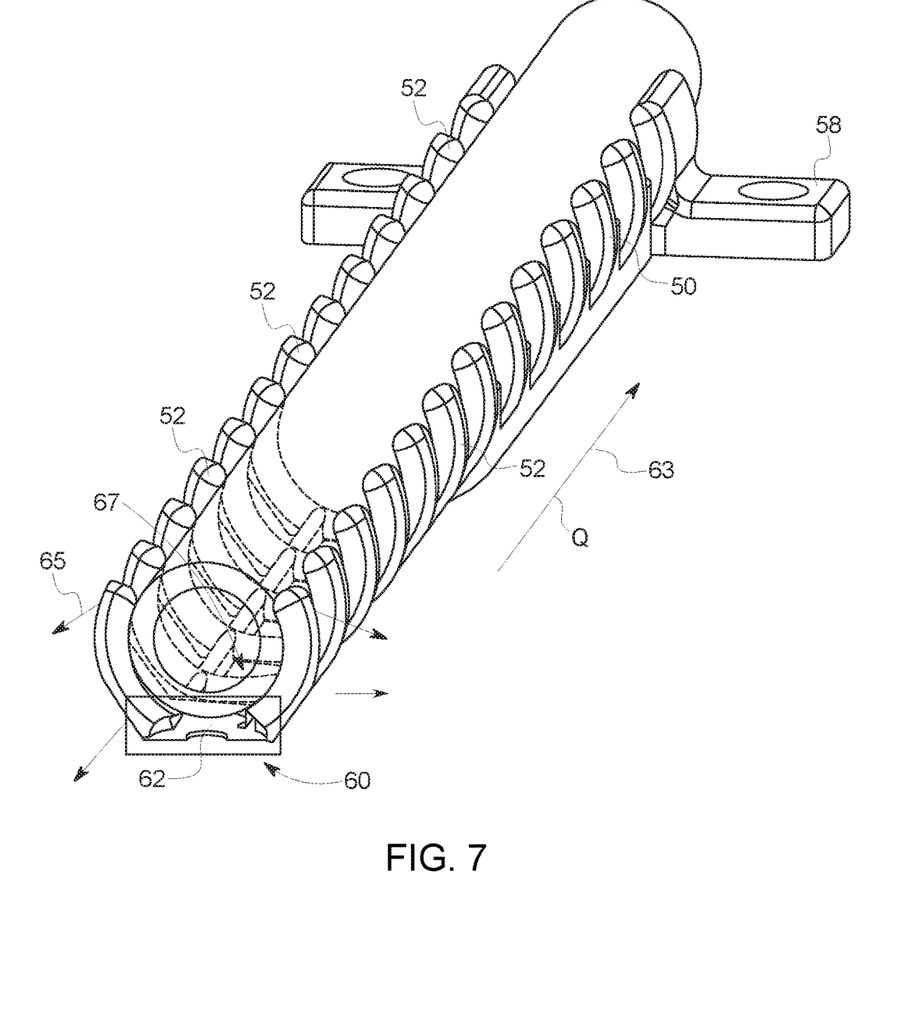
FIG. 7 is a perspective view of a Coriolis flow sensor assembly in accordance with the present disclosure.

FIG. 7 illustrates an embodiment of the interface 24 for the sensor assembly 14. As shown, the interface 24 includes an oscillator mount 58 that permits coupling between the interface 24 and the oscillator 28 by a bolt or screw. However, other coupling arrangements are contemplated. In the depicted embodiments, the interface 24 includes ribs 52 which may have variable geometry. For example, the ribs 52 may be thicker (i.e., wider) near the oscillator mount 58. The interface 24 also includes a backbone 62. As illustrated, the backbone 62 runs along the direction of flow 63 of the flow tube 20. The implementation provides a minimized fixed coupling point 60 between the ribs 52 and the backbone 62. Thus, the interface 24 may allow a radial deformation along arrows 65 due to pressure expansion of the tubing while not passing the stress to the oscillator 28 due to transversal deformation along the backbone 62. Further, the backbone 62 permits controlled heat flow along its length in the direction of flow 63. The backbone 62 may be an open frame backbone 62 with rails 66 that are spaced apart and that define openings 67 that align with the rib spacing. The open frame structure may also improve heat flow.

Figure 8:
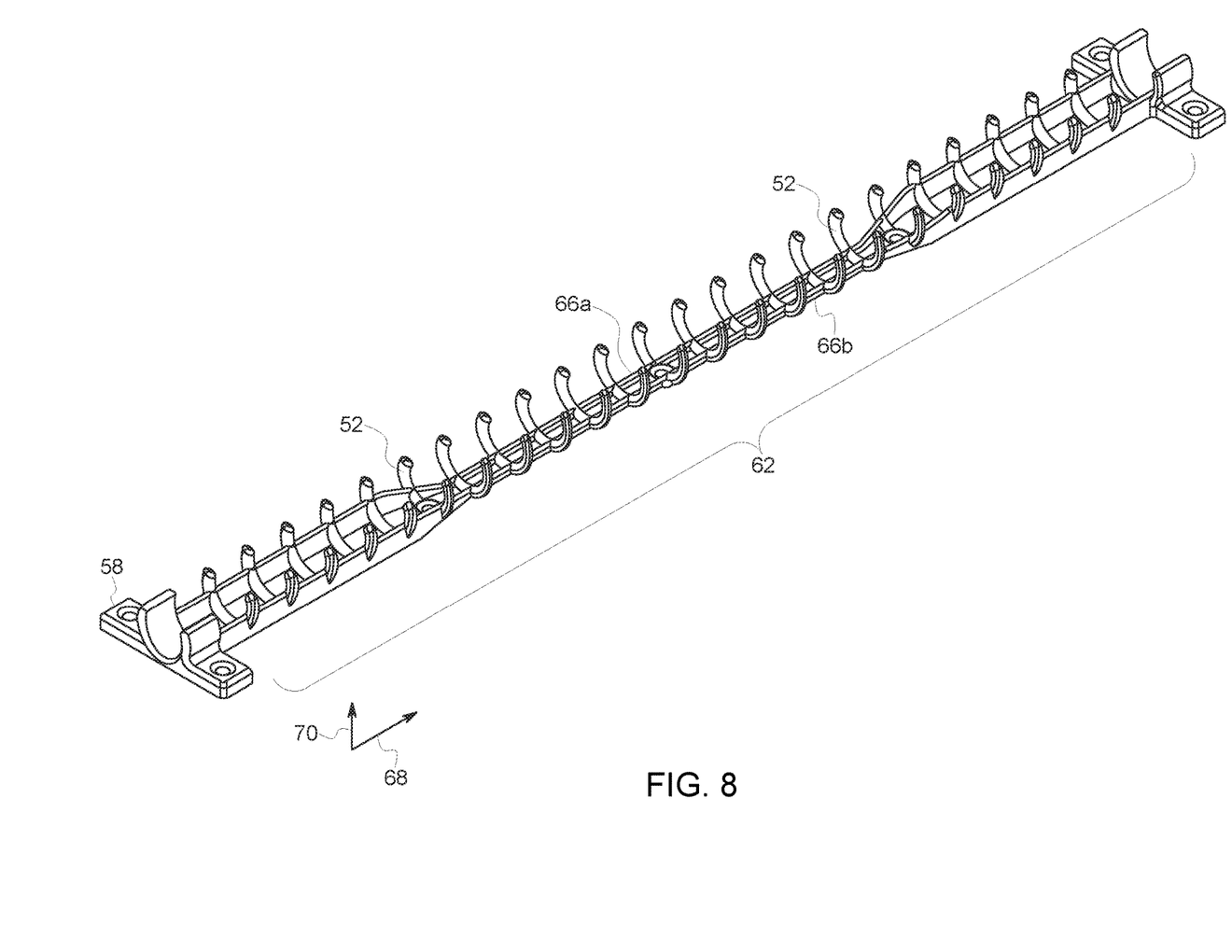
FIG. 8 is a perspective view of an interface with backbone features in accordance with the present disclosure.

FIG. 8 depicts an embodiment of the interface 24. The depicted interface 24 includes the backbone structure 62 with spaced-apart ribs 52 and the oscillator mount 58. As discussed, the mounting or coupling to the oscillator 28 may be any suitable structure, and the depicted oscillator mount 58 is by way of example only. The structure of the interface 24 reduces the surface in direct contact with the exterior surface of the flow tube 20 in order to control the transmission of force and temperature along the oscillator. For example, the ribs 52 are spaced apart to interrupt the direct contact of the interface with the flow tube 20. The contact area is suitable enough to permit a good oscillation/Coriolis force transmission from the oscillator 28 to the flow tube 20 via the interface 24. Further, the heat capacity is minimized to permit the flow tube 20 to quickly adapt to transient thermal events.

Figure 9:
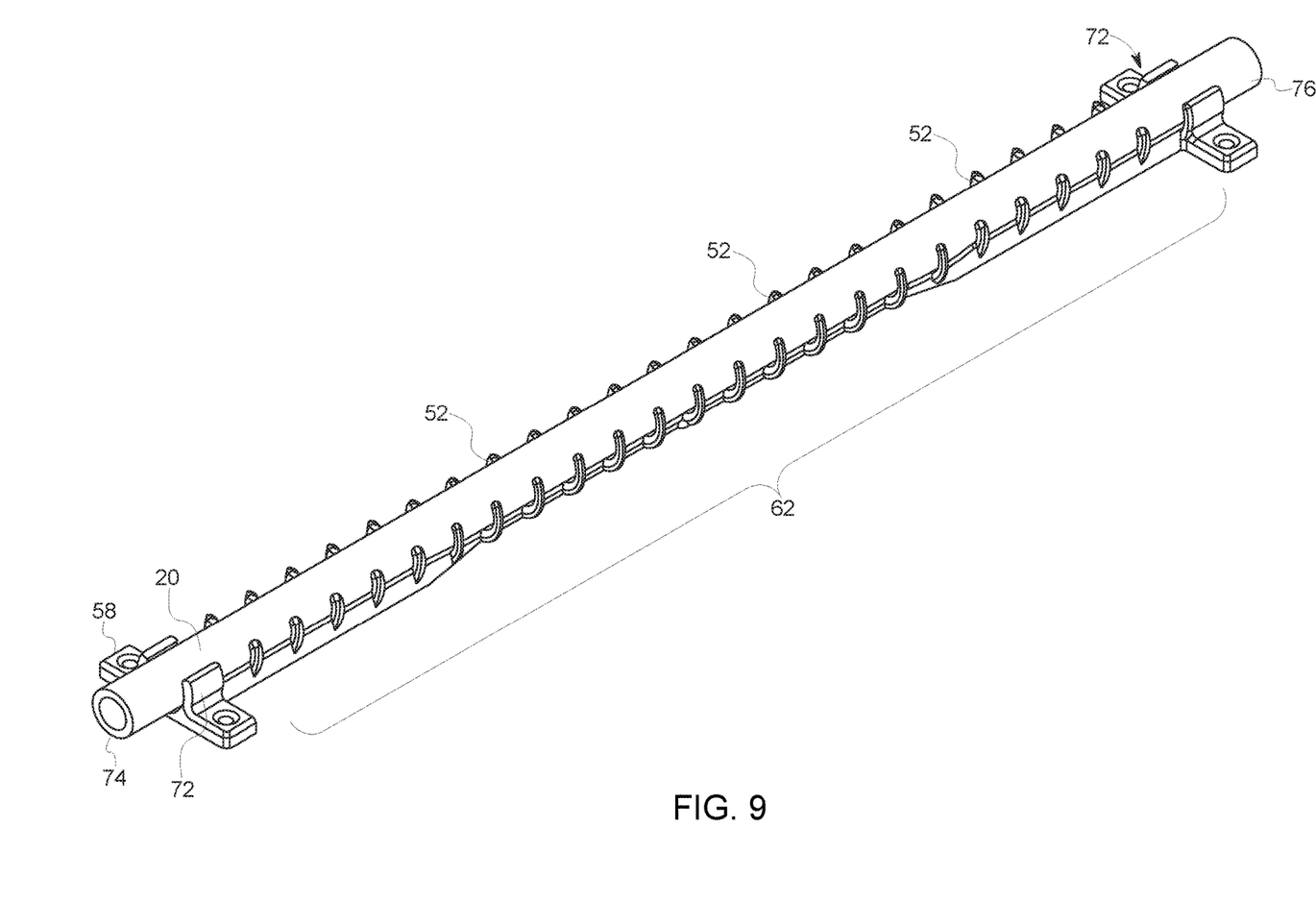
FIG. 9 shows the interface of FIG. 8 coupled to a flow tube in accordance with the present disclosure.
Figure 10:
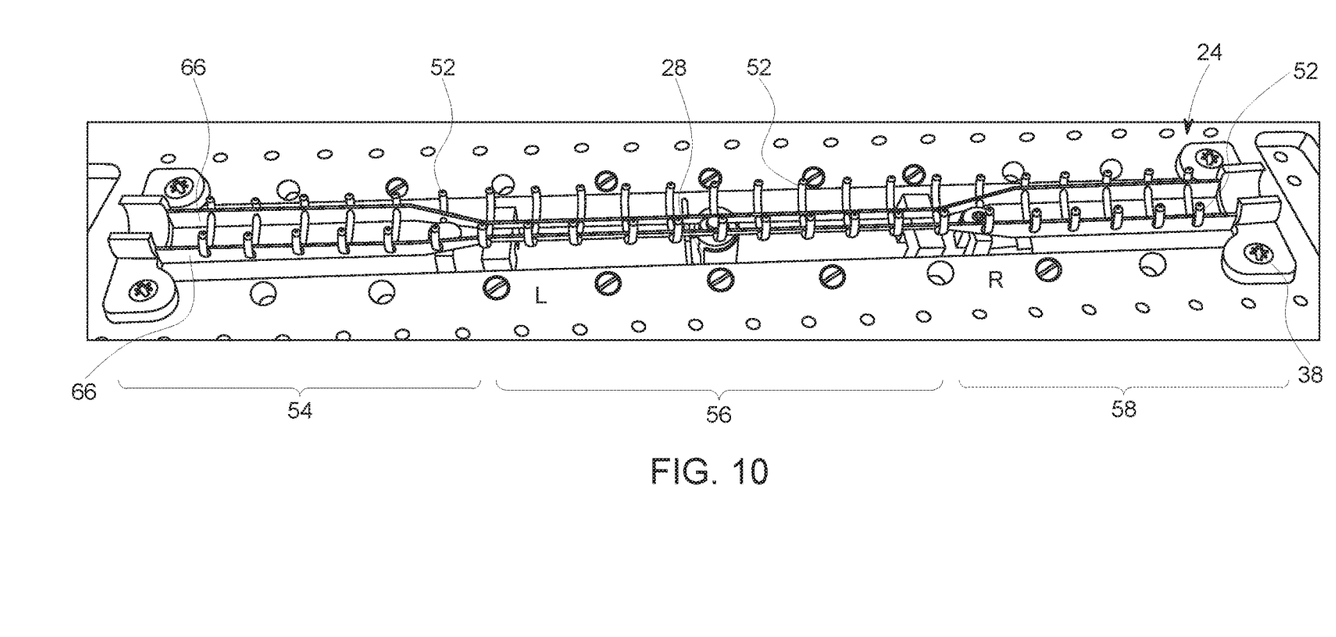
FIG. 10 is an image of a Coriolis flow sensor in accordance with the present disclosure.

The backbone structure 62 includes spaced-apart rails that are generally aligned in a direction along the flow axis 68. Further, the thickness of each rail 66 and the distance between them may vary to create different stiffness effects along the axis 70. FIG. 9 shows the interface 24 of FIG. 8 coupled to the flow tube 20. Clips 72 disposed at the ends of the interface 24 (e.g., on the oscillator mount 58) may provide greater retaining force at the interface oscillator mount point. The interface 24 may be arranged to permit overhang of the fluid entry point 74 and the fluid exit point 76 to permit coupling of the flow tube 20 to other tubing of the system 10. FIG. 10 shows the interface 24 of FIG. 8 fixed to an oscillator 28.

Figure 11:
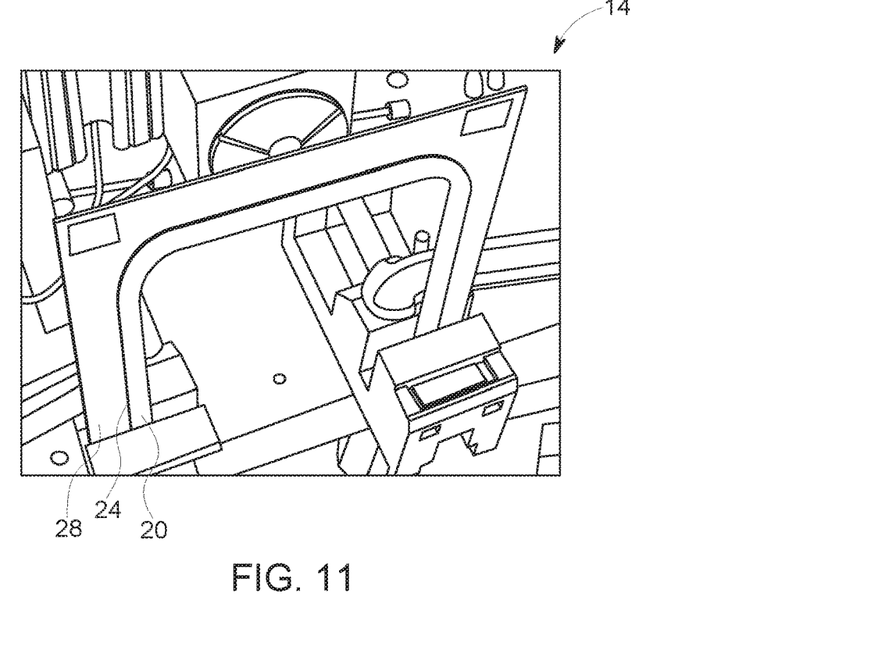
FIG. 11 shows a coupling between a flow tube and an oscillator of a Coriolis flow sensor assembly in accordance with the present disclosure.
Figure 12:
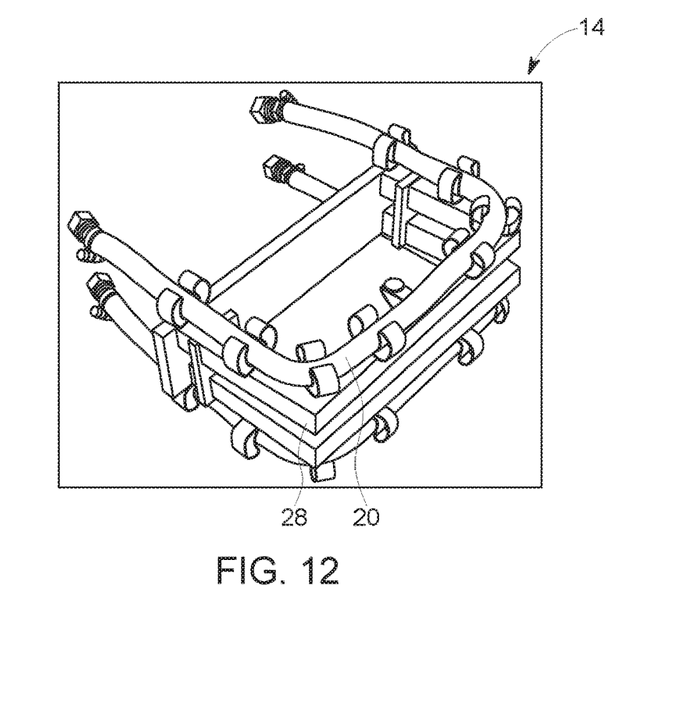
FIG. 12 shows a coupling between a flow tube and an oscillator of a Coriolis flow sensor assembly in accordance with the present disclosure.
Figure 13:
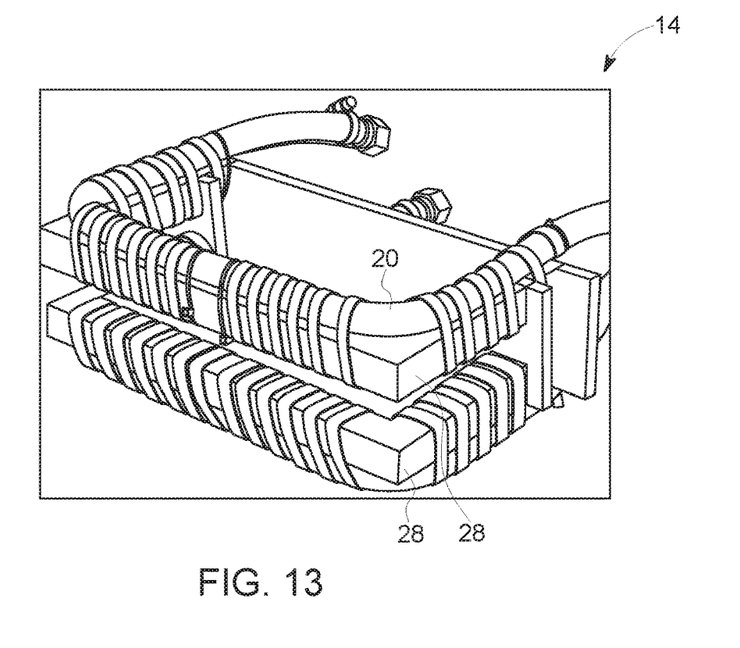
FIG. 13 shows a coupling between a flow tube and an oscillator of a Coriolis flow sensor assembly in accordance with the present disclosure.

FIG. 11-13 various embodiments of interfaces 24 for coupling the oscillator 28 to the flow tube 20 in accordance with the present disclosure. Moreover, while the shape of the flow tubes 20 shown in FIGS. 11-13 is a bent shape, any shape (e.g., straight or looped) may be incorporated in a Coriolis sensing assembly in accordance with the present techniques.

FIG. 11 shows the flow tube 20 coupled to a metal oscillator 28 by an adhesive (e.g., glue) interface 24. FIG. 12 shows the flow tube 20 coupled to a polymer oscillator 28 through metal clips 86. FIG. 13 shows the flow tube 20 coupled to a polymer oscillator 28 with a wire wrap 88. The sensor assemblies 14 depicted in FIGS. 11-13 may have variable performance. For example, FIG. 13 wire wrap showed superior performance relative to the metal clips and the adhesive. It should be appreciated by one of ordinary skill in the art that any combination of these techniques may be incorporated into a sensor assembly 14. For example, an adhesive interface 24 may be disposed between the flow tube 20 and the oscillator 28 in addition to the wire wraps 88. Moreover, the adhesive interface may be disposed at intervals along the direction of the flow, rather than continuously disposed.

Figure 14:
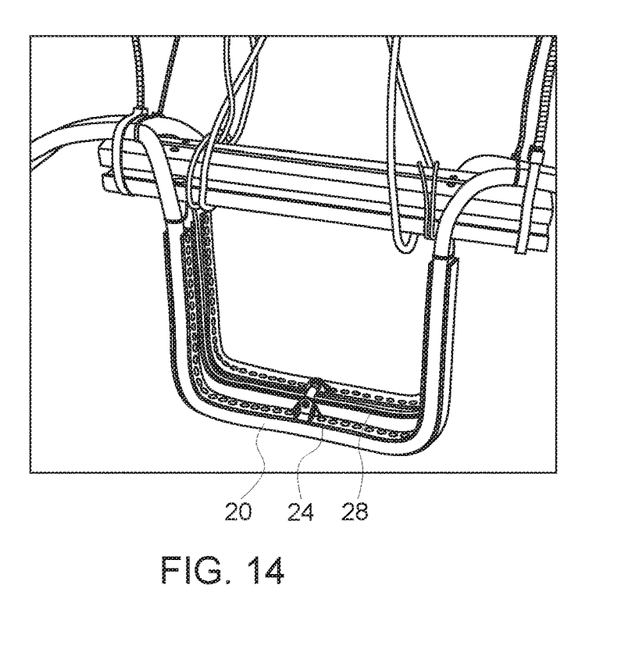
FIG. 14 shows interface coupling a flow tube and an oscillator of a Coriolis flow sensor assembly in accordance with the present disclosure.
Figure 15:
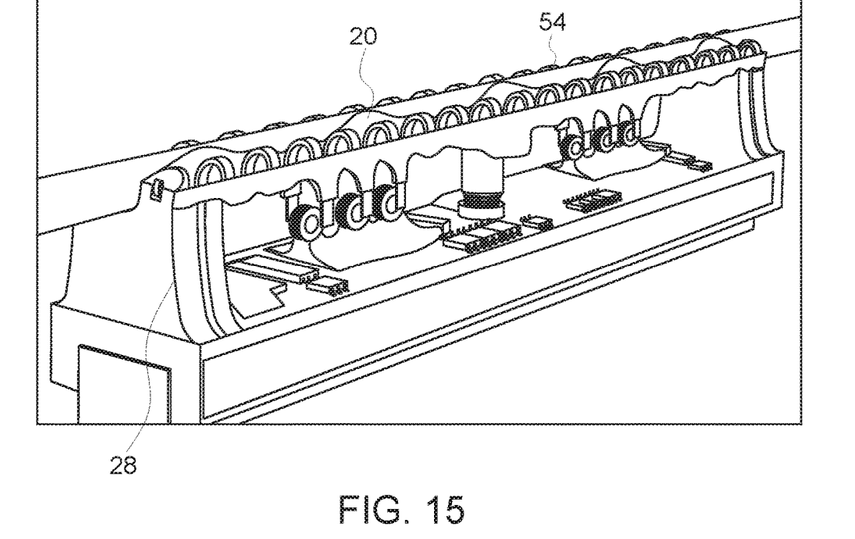
FIG. 15 shows interface coupling a flow tube and an oscillator of a Coriolis flow sensor assembly in accordance with the present disclosure.
Figure 16:
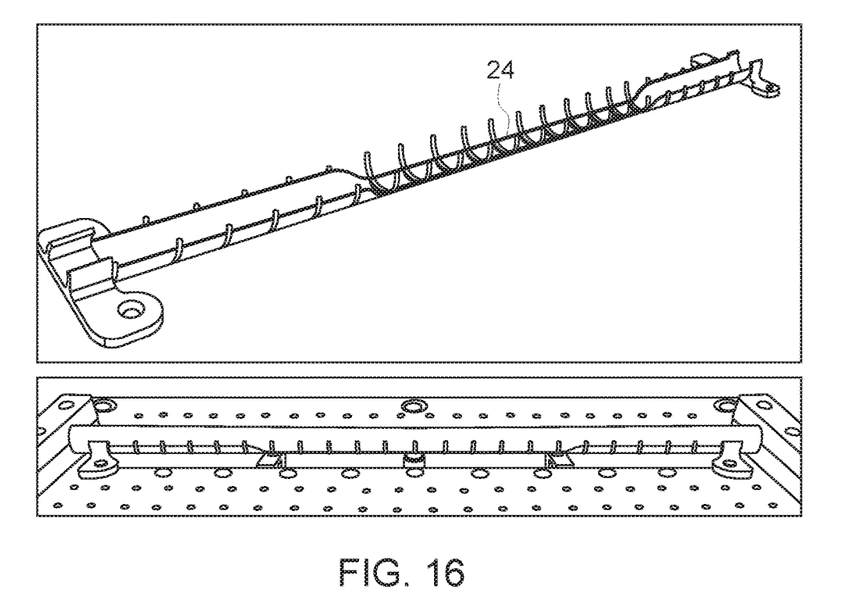
FIG. 16 shows interface coupling a flow tube and an oscillator of a Coriolis flow sensor assembly in accordance with the present disclosure.

FIGS. 14-16 shows various interfaces 24 for coupling the flow tube 20 and the oscillator 28 of a Coriolis flow sensor assembly 14 in accordance with the present disclosure. FIG. 14 shows a bent silicone flow tube 20 coupled to the oscillator 28 through a polymer interface 24. FIG. 15 shows a hybrid metal/polymer oscillator directly coupled to the silicone flow tube 20. As shown, there is no separate interface 24, however, the oscillator 28 includes structural features (e.g., walls) that enable the oscillator 28 and flow tube 20 to couple such that the oscillator 28 receives the flow tube 20 between the walls 54. Further, as shown, the walls 54 have a varying height, which may permit certain advantages as described herein. FIG. 16 shows an interface having a backbone, which demonstrated superior performance to the interfaces 24 shown in FIGS. 14-15.

Some applications for the disposable-part sub-system described herein include fabrication of wafers in semiconductor industry, and medical applications that involve use of organic fluids. Some of these are high purity applications, and use of flow conduit made of for example polymer, or other chemically inert material is advantageous in such applications, and in some other applications electrically inert and low thermal conductivity material like glass is advantageous.

This disclosure relates to a sensor assembly of a Coriolis flow sensor system with an interface that permits transmission of the drive oscillation and the Coriolis force, but limits the transmission of environmental disturbances that may negatively influence the drive oscillation of the flow tube. As discussed above, the interface may be disposed between a flow tube and an oscillator of the Coriolis flow sensor system. Moreover, the interface may be positioned between the flow tube and oscillator, disposed at the ends of a region between the flow tube and the oscillator, or at intervals along the region. The interface may include structural features that facilitate coupling between the interface and the oscillator (e.g., hooks, bolts, screws, adhesive material). Further, a portion of the interface that receives the flow tube may be flat or may partially surround a portion of the perimeter (e.g., circumference) of the flow tube. The interface may include (e.g., separately or be attached to) structural components that facilitate retaining of the flow tube as well as permit coupling between the flow tube, interface, and oscillator. For example, the interface may be partially rounded with a shape suitable for holding the flow tube, or the interface may include features (e.g., ribs or walls) that maintain coupling between the flow tube and the interface.

This written description uses examples to disclose the invention, including the best mode, and also to permit any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An assembly comprising:
   a flow tube configured to provide a flow path through the flow tube;
   a mechanical drive assembly configured to drive an oscillation of the flow tube while fluid is flowing, wherein the mechanical drive assembly comprises an oscillation surface; and
   an interface fixedly coupled to the oscillation surface of the mechanical drive assembly and configured to receive the flow tube such that at least a portion of the interface is in direct contact with the flow tube and such that the interface transfers oscillation forces of the oscillation surface to the flow tube.

2. The assembly of claim 1, wherein the interface is adhesively coupled to the oscillation surface.

3. The assembly of claim 1, wherein the interface comprises one or more wall features configured to partially enclose the flow tube upon the interface receiving the fluid flow assembly.

4. The assembly of claim 1, wherein the wall features have a varying height along a direction of the flow path.

5. The assembly of claim 1, wherein the interface is coupled to the fluid flow assembly with one or rib structures disposed along the interface in a direction of the flow path.

6. The assembly of claim 5, wherein the rib structures are in direct contact with the flow tube.

7. The assembly of claim 5, wherein the rib structures are disposed at regular intervals in the direction of the flow path.

8. The assembly of claim 1, wherein the interface separates the flow tube from the oscillation surface such that the flow tube does not directly contact the mechanical oscillator.

9. The assembly of claim 1, where in the interface comprises a backbone having spaced-apart rails.

10. The assembly of claim 1, wherein the interface comprises a metal clip that couples with the flow tube via a friction fit.

11. The assembly of claim 1, wherein the interface couples the mechanical drive assembly to the tube via a wire wrap.

12. An assembly comprising:
    a mechanical drive assembly configured to drive an oscillation of a flow tube while fluid is flowing, wherein the mechanical drive assembly comprises an oscillation surface; and
    an interface fixedly coupled to the oscillation surface of the mechanical drive assembly and configured to receive the flow tube, wherein the interface is configured to transfer oscillation forces from the oscillation surface to the flow tube.

13. The assembly of claim 12, wherein the interface comprises a plurality of retaining elements configured to retain the flow tube.

14. The assembly of claim 12, comprising the flow tube, wherein the flow tube is disposable.

15. The assembly of claim 12, wherein the interface is in direct contact with the oscillation surface.

16. The assembly of claim 12, wherein the interface comprises a backbone coupled to a plurality of ribs, wherein the ribs are configured to partially encircle the flow tube when the flow tube is coupled to the interface.

17. The assembly of claim 12, wherein the interface is configured to retain the flow tube along an axis.

18. The assembly of claim 12, wherein the interface is formed from a polymer.

19. An assembly comprising:
    a flow tube configured to provide a fluid flow path through the flow tube;
    a mechanical drive assembly configured to drive an oscillation of the flow tube while fluid is flowing via an oscillation surface; and
    an interface fixedly coupled to the oscillation surface of the mechanical drive assembly and configured to receive the fluid flow assembly such that the interface is in direct contact with an outer surface of the flow tube.

20. The assembly of claim 19, wherein the interface is in direct contact with both the mechanical drive assembly and the outer surface of the flow tube.

* * * * *